United States Patent [19]
Beudon et al.

[11] Patent Number: 6,113,486
[45] Date of Patent: Sep. 5, 2000

[54] FABRIC SHEATH FOR VENTILATION AND LAMINAR FLOW HOOD

[75] Inventors: Didier Beudon, Rambouillet; Guy-Paul Alix, Brest; Pierre Bridenne, Forges les Bains, all of France

[73] Assignee: U.N.I.R. Ultra Propre Nutrition Industrie Recherche, Paris, France

[21] Appl. No.: 09/171,775

[22] PCT Filed: Apr. 9, 1997

[86] PCT No.: PCT/FR97/00626

§ 371 Date: Oct. 26, 1998

§ 102(e) Date: Oct. 26, 1998

[87] PCT Pub. No.: WO97/40325

PCT Pub. Date: Oct. 30, 1997

[30] Foreign Application Priority Data

Apr. 25, 1996 [FR] France .................................. 96 05234

[51] Int. Cl.$^7$ .................................................. F24F 13/072
[52] U.S. Cl. .......................................... 454/187; 454/296
[58] Field of Search .............................. 454/60, 187, 188, 454/190, 296

[56] References Cited

U.S. PATENT DOCUMENTS

| | | | |
|---|---|---|---|
| 3,719,136 | 3/1973 | Criddle | 454/187 |
| 3,776,121 | 12/1973 | Truhan | 454/187 |
| 4,009,647 | 3/1977 | Howorth | 454/187 |

FOREIGN PATENT DOCUMENTS

| | | | |
|---|---|---|---|
| 936740 | 11/1973 | Canada . | |
| 0 282 051 | 9/1998 | European Pat. Off. . | |
| 2124780 | 9/1972 | France . | |
| 37 11 613 | 10/1988 | Germany | 454/187 |
| 39 09 497 | 10/1990 | Germany . | |
| 3-110342 | 5/1991 | Japan | 454/296 |
| 2 098 317 | 11/1982 | United Kingdom . | |

Primary Examiner—Harold Joyce
Attorney, Agent, or Firm—Foley & Lardner

[57] ABSTRACT

A fabric sheath (1) for the close protection of the conveyance of sensitive products by sterilized air stream diffusion, in particular in a substantially vertical direction is formed by a sealed wall (2) and a porous wall (3) extending longitudinally and axially along the sheath, the sheath defining a sterilized air supply duct (9). It comprises means (4) extending longitudinally along the sheath that ensure median sterilized air diffusion at a higher speed. The invention also features a washable or disposable laminar-flow hood, comprising a fabric sheath bounded at each end by a plane perpendicular to the axis of the fabric sheath.

21 Claims, 3 Drawing Sheets

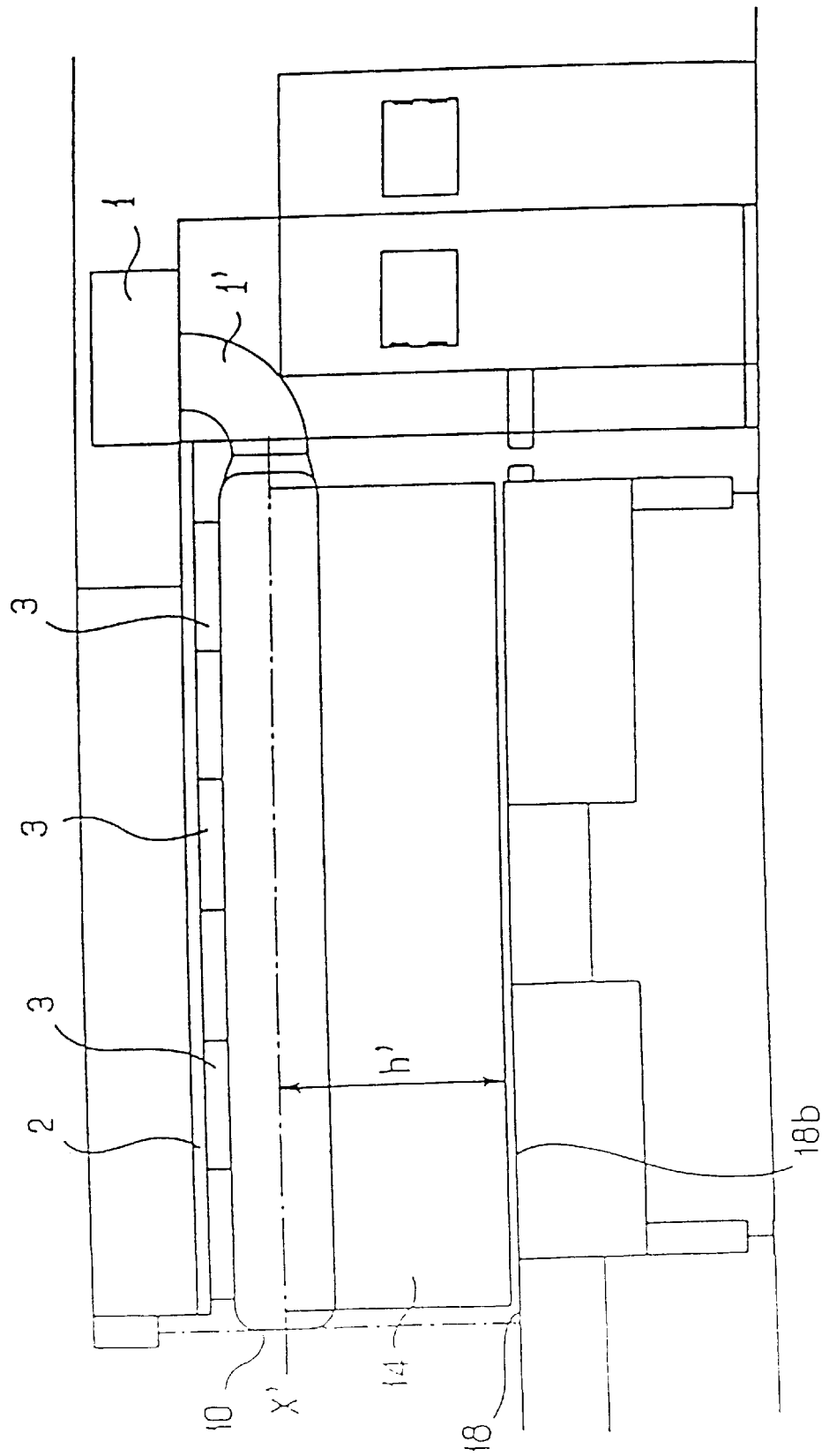
FIG_4

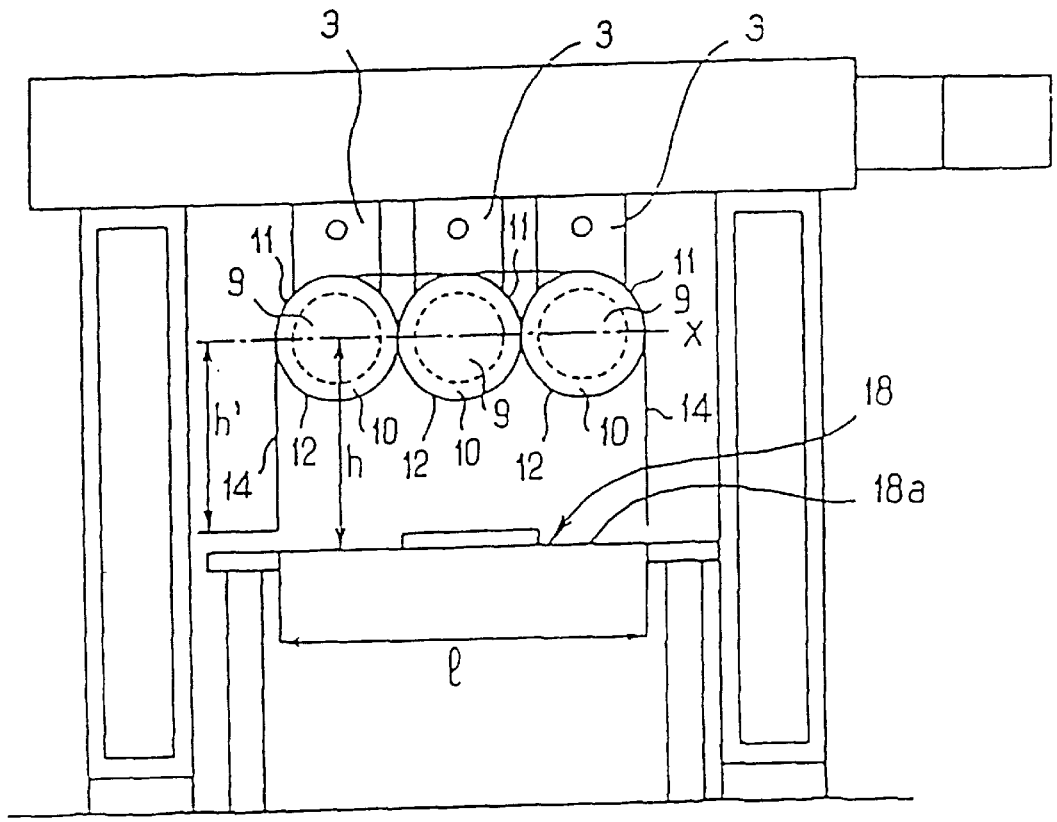
FIG_5
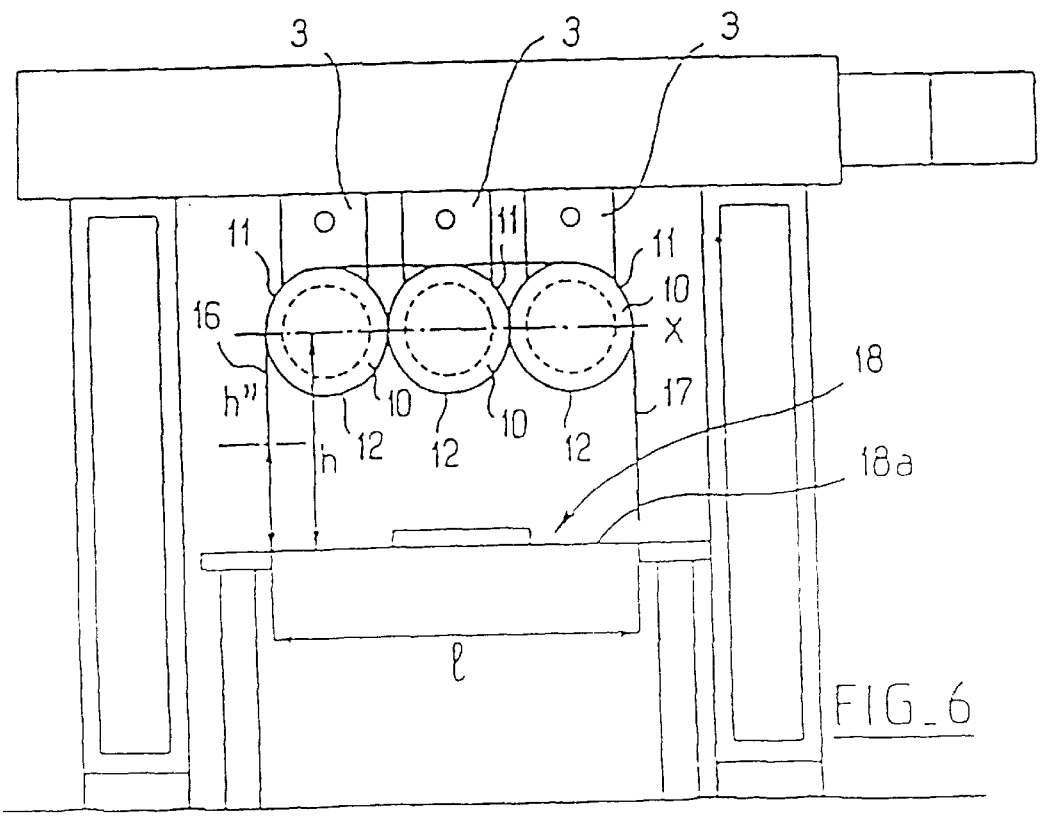
FIG_6

FABRIC SHEATH FOR VENTILATION AND LAMINAR FLOW HOOD

The present invention relates in a general manner to the close protection of a work station located in a contaminated atmosphere, and more particularly to a device for the close protection of products sensitive to contamination by airborne contaminants, said products being positioned on a work surface.

The present invention relates more particularly to a sheath for the close protection of the conveyance of sensitive products by the diffusion of a stream of sterile air, especially in an approximately vertical direction, said sheath being formed by an impermeable wall and a porous wall extending longitudinally parallel to the axis of the sheath, said sheath defining a sterile-air supply duct.

The invention also relates to a washable or disposable laminar-flow hood, as well as to a device for the close protection of a wide work surface comprising such sheaths.

The problem of protecting work stations from air contamination arises especially in the agro-foodstuffs industry, the pharmaceutical industry or in the hospital environment.

In general, in order to solve this type of problem, the work stations are located in rooms called "clean" rooms in which the air is filtered and treated so that the amount of dust lies below a controlled permissible threshold subject to strict regulations.

In addition, the air which circulates in these clean rooms is often regulated at a low temperature.

Staff having to work in such work stations must be clad in specialized suits which are difficult to get into and to wear.

The close protection of each individual work station is one way of solving the aforementioned drawbacks.

However, this close protection must take account of the fact that the staff working at these work stations must handle products sensitive to air contamination.

Likewise, it is undesirable to provide mechanical protection systems, for example doors, since opening and closing them causes flow disturbances incompatible with maintaining the sterility. This is why a sterile-atmosphere confining and maintaining means using only streams of air has already been described.

Thus, confining devices have been developed which are intended to ensure close protection of a particular volume with the aid of a slowly diffusing vertical stream of air, said stream of air being bordered by two more rapid jets of air which constitute the external means of protecting the volume.

This type of close protection may be implemented using various embodiments, especially box-type systems with diffusion grilles which make it possible to generate the streams of air with the appropriate speeds. Such a system is described in document U.S. Pat. No. 3,776,121; it comprises an air outlet plate pierced with holes, the surface area of which increases from the center to the periphery in order to generate a central slowly-diffusing stream of air bordered by rapidly diffusing streams of air.

However, these quite heavy devices are expensive, but above all are quite difficult to clean and not very flexible, especially when it is a question of providing close protection to a conveyance line following a sinuous path.

This is why the present invention proposes close-protection devices employing one or more textile sheaths capable of generating the desired gas flows. It is in principle possible to produce such a device with the aid of a textile sheath comprising a central diffusing part bordered longitudinally on each side by two slots.

In practice, the Applicant has observed that such a sheath, having a perimeter of 1.885 m, consisting, for example, of a central porous part corresponding to 25% of the perimeter (i.e. 0.47 m) bordered by two slots, each 15 mm in width (i.e. 0.016% of the perimeter in respect of the two slots), though giving certain useful results, does not, however, give optimum results. This is because the respective velocities of the rapid and slow streams of air are not constant along the sheath.

It would be possible to increase the pressure level inside the sheath. However, this would cause much too high a velocity increase in the slots. In fact, the difference in behavior between the porous fabric and the longitudinal slots does not make it possible to achieve a satisfactory result over a long length.

Finally, document FR-A-2,124,780 discloses a device comprising a sterile-air diffuser tube made of a porous textile material, but such a device does not provide a central diffusion of slow-velocity sterile air and, on either side of it, a lateral diffusion of higher-velocity sterile air.

One of the objects of the present invention is to solve the aforementioned problems and the subject thereof is a sheath making it possible to achieve diffusion of a stream of sterile air with a slow central velocity and a higher lateral velocity.

In general, textile sheath should be understood to mean hereafter a hose having any cross section and having a large portion of it made of textile. The sheath according to the invention may comprise parts made of plastic, especially semirigid parts.

The present invention relates to a sheath for the close protection of the conveyance of sensitive products by the diffusion of a stream of sterile air, especially in an approximately vertical direction, said sheath being formed by an impermeable wall and a porous wall extending longitudinally parallel to the axis of the sheath, said sheath defining a sterile-air supply duct and being characterized in that it comprises a means, extending longitudinally along said porous wall, providing a central diffusion of slow-velocity sterile air and, on either side of it, a lateral diffusion of higher-velocity sterile air.

Preferably, the width of the streams is in total approximately equal to the diameter of the sheath, the rapid jets being approximately tangential to the ends of the diameter and directed, like the slow jets, perpendicularly to said diameter.

Preferably, the central or slow diffusion velocity is between 0.2 and 1 m/s and the velocity of the lateral or rapid jets is between 0.5 and 5 m/s for an air pressure in the duct of between 25 and 1000 Pa.

According to a first embodiment, said means is a diffusion bag which extends longitudinally, is connected via the porous wall to the duct of the sheath conveying the sterile air and is closed by a porous external wall through which the stream of sterile air diffuses. The porous wall preferably occupies between 25 to 50% of the perimeter of the sheath.

Preferably, the external wall of the diffusion bag comprises two impermeable lateral strips fastened to the edges of said impermeable wall and a porous central region bordered by two lateral slots adjacent to said lateral strips. Advantageously, the ratio of the porous central region to a slot is between 10 and 100.

In general, the resistance to the passage of air of the porous wall is sufficiently high to obtain good longitudinal constancy of the velocities of the air passing through it in order to supply the diffusion bag.

According to a second embodiment, the textile sheath is characterized in that it is formed by an impermeable upper half-sheath and a porous lower half-sheath, the longitudinal extremities of the impermeable half-sheath each being extended tangentially by a skirt.

These skirts may be equal in length.

According to another embodiment, they differ in length. In this case, access to the protected region preferably takes place from the side having the shorter skirt. This type of sheath may also be used to form a means of protecting a limited volume. This is because, if the sheath thus formed is limited at the ends by a plane perpendicular to the axis of the textile sheath, a conventional laminar-flow hood is obtained, the main part of which is washable.

The invention also proposes a device for the close protection of a wide work surface, which comprises, above said work surface, a plurality of sheaths juxtaposed in a direction parallel to the direction of the transverse edge of said work surface, each sheath being formed by an impermeable upper half-sheath and a porous lower half-sheath defining a sterile-air supply duct, the external longitudinal extremity, located level with a longitudinal edge of the work surface, of the impermeable upper half-sheath of each of the sheaths, which are located at the two ends of the juxtaposition, being extended tangentially by a skirt.

Thus, the device according to the invention makes it possible to protect wide work surfaces with a central stream of sterile air diffusing slowly bordered laterally by streams of sterile air diffusing more rapidly, the diffusion of sterile air taking place in a direction approximately perpendicular to the work surface. The cost of installing such a device is much lower, by a factor of about six, than that of conventional box devices.

Furthermore, the device having textile sheaths according to the invention may advantageously be cleaned by simply disconnecting the sheaths because the sterile-air supply for the said sheaths may be placed away from the latter. Disconnecting the sheaths does not therefore necessarily involve disconnecting the supply. By contrast, the conventional device, which comprises an air-supply fan equipped on the upstream side with a prefilter and on the downstream side with a terminal filter, is consequently not disconnectable.

In addition, the device having textile sheaths according to the invention makes it possible, highly advantageously, to distribute sterile air at a controlled temperature and controlled relative humidity above the work surface.

The invention will now be illustrated by the following description and by the appended drawings.

FIG. 4 is a diagrammatic side view of an embodiment of a device having several sheaths according to the invention.

FIG. 5 is a diagrammatic front view of the device in FIG. 4.

FIG. 6 is a diagrammatic front view of an alternative embodiment of the device having several sheaths according to the invention.

Figure 1:
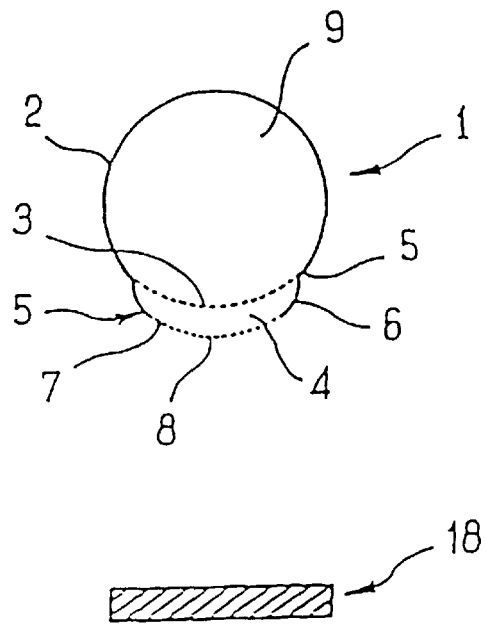
FIG. 1 is a cross-sectional view of a first embodiment according to the invention.

According to a first embodiment of the device according to the invention, shown in FIG. 1, a textile sheath 1 containing a duct 9 supplied with sterile air comprises an impermeable wall 2 made of a textile that is "impermeable or of a plastic film" forming part of the perimeter and a porous wall 3 via which a longitudinal diffusion bag 4 is supplied, the external wall 5 of which has two lateral strips 6 fastened to the longitudinal extremities of the impermeable wall 2 and a porous central region 8 bordered by two lateral slots 7 adjacent to said impermeable lateral strips 6. The sheath is located above a conveyor 18.

The diffusion bag thus created eliminates the constraint of longitudinal distribution.

For a 600 mm diameter sheath, i.e. a perimeter of 1.885 m, the porous part 3 occupies 25% of the perimeter, i.e. a 0.47 m circular arc. The slots have a width of 5 to 10 mm and the porous central region 8 has a width of 300 mm.

The device thus produced makes it possible to provide a slow diffusion via the central region, this diffusion being flanked by two rapid jets.

Figure 2:
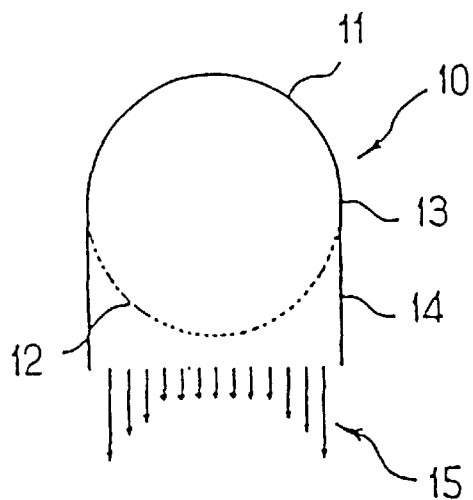
FIG. 2 is a cross-sectional view of a second embodiment according to the invention.

According to the second embodiment, indicated in FIG. 2, a sheath 10 is formed by a porous lower half-sheath 12. The perimeter is also 1.885 m. The longitudinal edges 13 of the impermeable half-sheath 11 are each extended tangentially by a skirt 14, the two skirts being equal in length.

Since the semicircumference (half-sheath 12) is porous, the flow, in vertical projection, results in the velocity profile shown at 15.

Figure 3:
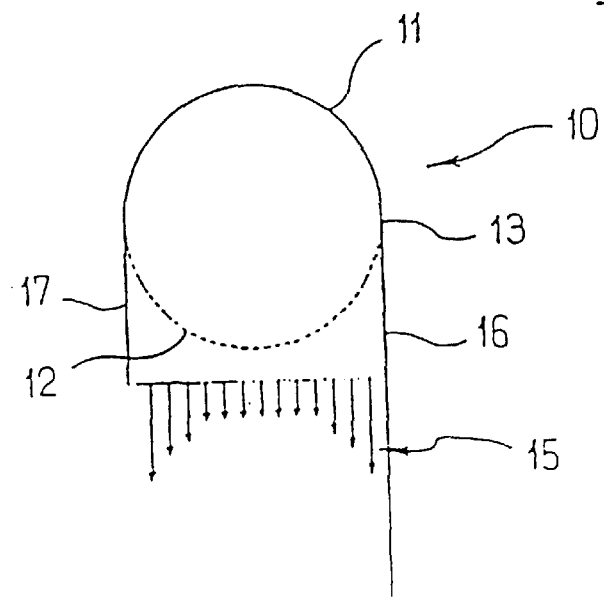
FIG. 3 is a cross-sectional view of a third embodiment according to the invention.
Figure 3:

According to FIG. 3, the same sheath as in FIG. 2 is bordered by two skirts 16 and 17 which differ in length. This device, bounded at each end by a plane (not shown) perpendicular to the axis of the textile sheath, becomes a conventional laminar-flow hood which can be washed or thrown away after use.

When there is no slot, the porous fabric may be chosen so as to be quite resistant to the passage of air in order to obtain good longitudinal distribution.

The skirts may be made of a fabric of plastic film, each skirt being ballasted by a stainless steel rod placed in a hem at the bottom (not shown).

The velocity level which the device according to the invention generally allows to be achieved is, for the central (slow) region, between 0.2 and 1 m/s and, for the rapid jets, between 0.5 and 5 m/s for an air pressure of between 25 and 1000 Pa.

FIGS. 4 and 5 show a device for the close protection of a wide work surface 18.

Here, the useful width 1 of the work surface 18 is about 1.20 m.

This device comprises, above said work surface 18, a plurality of textile sheaths 10 juxtaposed contiguously in a direction X parallel to the direction of the transverse edge 18a of said work surface 18. Here, in order to cover the entire useful width of the work surface, there are three textile sheaths 10.

Of course, for greater widths, it would be possible for the device according to the present invention to be provided with a number greater than 3 of sheaths juxtaposed in the direction X parallel to the edge 18a of said work surface.

Each sheath 10 is formed by an impermeable upper half-sheath 11 and a porous lower half-sheath 12 which define a sterile-air supply duct 9 of tubular shape and of longitudinal axis X'.

The fabric used to produce the impermeable upper half-sheath is, for example, a polyester-fiber fabric which has a mesh-opening pore size of 5 to 10 µm. The fabric used for the porous lower half-sheath is, for example, a polyester-fiber fabric which has a mesh-opening pore size of 15 to 30 µm.

The sheaths 10 extend longitudinally parallel to the longitudinal edge 18b of said work surface, over the entire length of the latter (in this case, 3.50 m).

As may be seen in FIGS. 4 and 5, the external longitudinal extremity, located level with a longitudinal edge 18b of the work surface 18, of the impermeable upper half-sheath 11 of each of the sheaths 10, which are located at the two ends of the juxtaposition, is extended tangentially by a skirt 14. The two skirts 14 located at each end of the juxtaposition extend approximately perpendicularly to the work surface 18. According to the embodiment shown more particularly in FIG. 5, the two skirts 14 are equal in length, here the length h' of said skirts 14 corresponds approximately to the height h, taken perpendicularly to the work surface, between the work surface 18 and the central axis X of the sheaths 10.

Of course, according to another embodiment shown more particularly in FIG. 6, provision may be made for the skirts to differ in length - here the skirt 16 is shorter than the skirt 17 and extends over a length h" approximately equal to 50% of said height h between the work surface 18 and the axis X of the sheaths 10.

More generally, the length of the skirts may be between 50% and 100% of the height between the work surface and the central axis of the sheaths.

These skirts are made of plastic, preferably a transparent plastic so that an operator located on one side of the device can visually inspect what is happening on the work surface.

The fact that a skirt 16 has a length h" which is less than the height between the central axis of the sheaths and the work surface advantageously allows an operator to carry out manual work on the work surface 18.

As may be seen in FIGS. 4 to 6, the sheaths are suspended from structural tubes 2 of the device by means of vertical suspension supports 3, in this case three vertical suspension supports 3, distributed uniformly along the entire length of the sheaths 10. The sheaths 10 are supplied by a supply apparatus 1 with sterile air via supply ducts 1', the air pressure in each duct 9 of each sheath being between 25 and 1000 Pa.

Thus, the velocity profile of the sterile air emanating from the device shown in FIGS. 4 to 6 is such that it has a relatively slow central sterile-air diffusion velocity of between 0.2 and 1 m/s and a higher lateral sterile-air diffusion velocity of between 0.5 and 5 m/s.

According to an advantageous characteristic of the device for protecting a wide work surface, a taut porous flexible ceiling (not shown here) may be provided just beneath the sheaths over the entire width of the work surface. This is particularly advantageous for attenuating any slight increase in the air diffusion velocity at the junction between two successive sheaths and for obtaining a flat diffusion velocity profile in the central part of the work surface.

Such a taut flexible ceiling may be advantageously used in an embodiment in which the two transverse end sides of said device are closed by skirts of the type located on the longitudinal edges of the outer sheaths, in order to limit the transverse edge effects and reduce the head losses. The use of such a taut porous flexible ceiling beneath said sheaths allows optimum control of the flows of sterile air emanating therefrom.

Several air-sampling points were produced above the work surface of the device shown in FIGS. 4 to 6, at different points of said work surface, in order to check the quality of the air. More particularly, air-sampling points were produced at 50 mm and at 150 mm from said work surface. A number of contaminating or dust particles having a diameter greater than 0.5 μm was counted, thereby confirming that the quality of the air above said work surface protected by such a device was good since this air comprised less than 100 particles of large diameter (diameter>5 μm) per cubic foot. Thus, the air quality is Class 100 according to United States Standard FS 209E. For comparison, the particle measurement of the ambient air in the room in which said work surface is located results in the ambient air being classified as Class 100,000 according to said FS 209E standard, with a number of large contaminating particles per cubic foot of greater than 1000.

Of course, the present invention is in no way limited to the embodiments described and shown, but those skilled in the art will be able to provide any embodiment of the invention in accordance with the scope thereof.

What is claimed is:

1. Textile sheath (1) for the close protection of the conveyance of sensitive products by the diffusion of a stream of sterile air formed by an impermeable upper wall (2) and a porous lower wall (3) extending parallel to the longitudinal axis X of the sheath and defining, between themselves, a sterile-air supply duct (9), characterized in that it comprises a diffusion bag (4) which extends longitudinally, is connected via the porous wall (3) to the duct (9) of the sheath, conveying the sterile air, and is closed by a porous external wall (5) through which the stream of sterile air diffuses, so as to provide a central diffusion of slow-velocity sterile air and, on either side of it, a lateral diffusion of higher-velocity sterile air.

2. Sheath according to claim 1, characterized in that the external wall (5) of the diffusion bag (4) comprises two impermeable lateral strips (6) fastened to the edges of the impermeable wall (2) and a porous central region (8) bordered by two lateral slots (7) adjacent to said lateral strips.

3. Sheath according to claim 1, characterized in that the resistance to the passage of air of the porous wall is sufficiently high to obtain good longitudinal constancy of the velocities of the air passing through it.

4. Sheath according to claim 1, characterized in that the porous wall (3) occupies from 25% to 50% of the perimeter of the sheath.

5. Sheath according to claim 2, characterized in that the ratio of the width of the porous central region to a slot is between 10 and 100.

6. Sheath according to claim 1, characterized in that the stream of air is in an approximately vertical direction.

7. Textile sheath (10) for the close protection of the conveyance of sensitive products by the diffusion of a stream of sterile air formed by an impermeable upper wall and a porous lower wall, extending parallel to the longitudinal axis of the sheath and defining, between themselves, a sterile-air supply duct, characterized in that it is formed by an impermeable upper half-sheath (11) and a porous lower half-sheath (12) providing a central diffusion of slow-velocity sterile air, the longitudinal extremities (13) of the impermeable half-sheath (12) each being extended tangentially by a skirt (14) providing, on either side of the central diffusion of slow-velocity sterile air, a lateral diffusion of higher-velocity sterile air.

8. Sheath according to claim 7, characterized in that the skirts are equal in length.

9. Sheath according to claim 7, characterized in that the skirts (16, 17) differ in length.

10. Sheath according to claim 9, characterized in that the central diffusion velocity is between 0.2 and 1 m/s and the lateral diffusion velocity is between 0.5 and 5 m/s for an air pressure in the duct of between 20 and 1000 Pa.

11. Sheath according to claim 7, characterized in that the stream of air is in an approximately vertical direction.

12. Laminar-flow hood, characterized in that it is formed by a textile sheath (10) for the close protection of the conveyance of sensitive products by the diffusion of a stream of sterile air formed by an impermeable upper wall and a porous lower wall, extending parallel to the longitudinal axis of the sheath and defining, between themselves, a sterile-air supply duct, characterized in that it is formed by an impermeable upper half-sheath (11) and a porous lower half-sheath (12) providing a central diffusion of slow-velocity sterile air, the longitudinal extremities (13) of the impermeable half-sheath (12) each being extended tangentially by a skirt (14) providing, on either side of the central diffusion of slow-velocity sterile air, a lateral diffusion of higher-velocity sterile air, and in that it is closed at the two ends by a plane perpendicular to the axis of the textile sheath.

13. Laminar-flow hood according to claim 12, characterized in that it is made of fabric.

14. Laminar-flow hood according to claim 12, characterized in that the stream of air is in an approximately vertical direction.

15. Device for the close protection of a wide work surface (28), comprising, above said work surface (18), a plurality of sheaths (10) juxtaposed in a direction parallel to the direction of the transverse edge (18a) of said work surface (18), each sheath (10) being formed by an impermeable upper half-sheath (11) and a porous lower half-sheath (12), defining a sterile-air supply duct (9), the external longitudinal extremity (11a), located level with a longitudinal edge (18b) of the surface (18), of the impermeable upper half-sheath (11) of each of the sheaths (10), which are located at the two ends of the juxtaposition, being extended tangentially by a skirt (14).

16. Device according to claim 15, characterized in that the sheaths (10) are contiguous.

17. Device according to claim 16, characterized in that it has a slow central sterile-air diffusion velocity of between 0.2 and 1 m/s and a rapid lateral sterile-air diffusion velocity of between 0.5 and 5 m/s for an air pressure in each duct of between 25 and 1000 Pa.

18. Device according to claim 17, characterized in that the skirts (14) are equal in length.

19. Device according to claim 17, characterized in that the skirts (16, 17) differ in length.

20. Device according to claim 19, characterized in that the length of skirts (14, 16, 17) is between 50% and 100% of the height between the work surface (18) and the central axis (X) of the sheaths (10).

21. Device according to claims 20, characterized in that a taut porous flexible ceiling is provided just beneath the sheaths over the entire width of the surface.

* * * * *